(12) United States Patent
Paul et al.

(10) Patent No.: US 7,251,132 B1
(45) Date of Patent: Jul. 31, 2007

(54) RECEIVING FRAME HAVING REMOVABLE COMPUTER DRIVE CARRIER AND LOCK

(75) Inventors: Dieter G. Paul, Anaheim, CA (US); Choon-Tak Tang, Irvine, CA (US)

(73) Assignee: Kingston Technology Corporation, Fountain Valley, CA (US)

( * ) Notice: Subject to any disclaimer, the term of this patent is extended or adjusted under 35 U.S.C. 154(b) by 0 days.

(21) Appl. No.: 11/352,367

(22) Filed: Feb. 13, 2006

(51) Int. Cl.
*G06F 1/16* (2006.01)
(52) U.S. Cl. .................. 361/685; 312/223.1; 248/618
(58) Field of Classification Search .. 312/223.1–223.6; 451/262, 180, 618; 248/211; 361/679–687, 361/724–727
See application file for complete search history.

(56) References Cited

U.S. PATENT DOCUMENTS

| | | | |
|---|---|---|---|
| 6,249,432 B1 * | 6/2001 | Gamble et al. | 361/685 |
| 6,483,107 B1 * | 11/2002 | Rabinovitz et al. | 250/239 |
| 6,535,381 B2 * | 3/2003 | Jahne et al. | 361/685 |
| 7,139,166 B2 * | 11/2006 | Marcade et al. | 361/685 |

* cited by examiner

*Primary Examiner*—Hung Van Duong
(74) *Attorney, Agent, or Firm*—Morland C. Fischer

(57) ABSTRACT

A computer drive carrier to be removably received within a receiving frame so that a computer drive transported by the carrier can be interfaced with a host computer. A handle is pivotally connected to the computer drive carrier and adapted to be rotated between a closed position when the carrier is received within the receiving frame and an open position when it is desirable to remove the carrier and its drive from the receiving frame to be replaced by a different carrier. A key controlled lock is mounted on the receiving frame and includes a locking pawl that is rotatable from an unlocked position, at which to permit the handle to be rotated from the closed position to the open position so that the computer drive carrier can be removed from its receiving frame, to a locked position, at which to prevent the handle from being rotated to the open position so that the computer drive carrier is locked in place in the receiving frame. A microcontroller is located on the receiving frame and responsive to when a SAS computer drive has been inserted within a SATA receiving frame so as to initiate a LED warning signal to indicate a potential overheating condition. The microcontroller also prevents a manual shutdown of the computer drive when the drive carrier is locked within its receiving frame.

19 Claims, 4 Drawing Sheets

RECEIVING FRAME HAVING REMOVABLE COMPUTER DRIVE CARRIER AND LOCK

BACKGROUND OF THE INVENTION

1. Field of the Invention

This invention relates to a receiving frame interfaced with a host computer to removably receive a computer drive carrier in which a computer drive is transported and to a locking system to prevent a removal of the carrier from its receiving frame. A microcontroller is located on the receiving frame to be interfaced with the locking system to prevent a manual shutdown of the drive when the drive carrier is locked within its receiving frame and to generate a visual warning signal in the event that a SAS drive has been inserted into a SATA receiving frame.

2. Background Art

With the advent of personal computers and workstations, it is often necessary to remove the medium on which computer data is stored. For example, it may be desirable to remove a storage medium so as to be carried to a different location and/or to a different computer system. It may also be desirable to remove the storage medium to a secure location when the computer data that is stored therein is particularly sensitive or secret. To accomplish the foregoing, computer storage media (e.g., disc drives) are transported by portable carriers that are removably received within a storage enclosure or chassis that is interconnected with a host computer. The removable disc drive carrier is simply pulled out of its chassis on an as-needed basis. Either the original disc drive carrier or a different carrier can be returned to the chassis. This insertion/removal cycle of the carrier usually occurs several times throughout the workday. By way of example only, reference may be made to U.S. Pat. No. 6,442,022 issued Aug. 27, 2002 for one example of a removable disc drive carrier. Reference may also be made to our earlier filed co-pending patent application Ser. No. 11/229,174 for an example of a locking system that is associated with a removable disc drive carrier and receiving frame.

Because of its removable nature, it is possible for an unauthorized individual to withdraw the computer drive carrier from its receiving frame without being detected. In this case, sensitive computer data could become lost and/or stolen. Therefore, it would be desirable to have a reliable, easy to use locking system by which to prevent the unauthorized or inadvertent removal of a computer drive carrier from its receiving frame.

Occasionally, a computer drive carrier will transport a SAS computer drive that is known to be incompatible with a SATA receiving frame. When such a computer drive is located in a SATA receiving frame, an overheating condition may result. In the event the overheating condition is not corrected early, some or all of the system could be exposed to a thermally induced failure. Therefore, it would also be desirable to provide means at the receiving frame by which to detect a potential drive/receiving frame mismatch and to provide a warning signal in the event such a mismatch is detected. In this same regard, and to prevent possible damage to the computer drive being transported by the computer drive carrier, it is still further desirable to be able to monitor the status of the computer drive and to provide drive status signals to users to indicate when the drive is fully spun up and ready to be accessed by its host, when the drive is fully spun down and safe to be removed with its carrier from the receiving frame, or when the drive is not receiving power.

SUMMARY OF THE INVENTION

Briefly, and in general terms, a receiving frame is disclosed in combination with a computer drive carrier which is removably received within the receiving frame so that a computer drive (e.g., a disc drive) that is transported by the carrier can be interfaced with and accessed by a host computer. The computer drive carrier has a handle that is rotatable between a closed position, when the computer drive carrier is received in the receiving frame, and an open position, when the computer drive carrier is to be removed from the receiving frame. One end of the handle is pivotally connected to the front of the computer drive carrier, and the opposite free end is capable of rotating from the closed position, at which the handle extends laterally across the carrier, to the open position, at which the handle extends away from the carrier in order to receive an outward pulling force for removing the carrier from its receiving frame.

The free, rotating end of the handle includes a rearward projection that is received within a lock housing at the front of the carrier when the handle is in the closed position. A locking nub is carried by the handle. When the handle is rotated to the closed position, the locking nub is correspondingly moved into and captured by a spring-loaded catch at the front of the carrier, whereby to hold the handle in the closed position. When it is desirable to cause the handle to rotate from the closed position to the open position at which to receive an outward pulling force so that the carrier can be removed from its receiving frame, a momentary pushing force is applied to the handle for causing the rearward projection thereof to move through the lock housing and the locking nub to be moved against and ejected from the spring-loaded catch.

A lock is located on the receiving frame. The lock includes a key controlled locking pawl. The locking pawl is rotatable between an unlocked position, at which to permit the handle and the locking nub to move together in a direction towards the spring-loaded catch in response to the momentary pushing force applied to the handle so that the handle can rotate from the closed to the open position, and a locked position, at which to block the handle and the locking nub from moving together towards the spring loaded catch and thereby prevent the handle from rotating to the open position. In particular, the locking pawl in the locked position extends across the lock housing to establish a stop by which to block the rearward projection from moving through the lock housing and the locking nub from moving towards the spring-loaded catch in response to the momentary pushing force applied to the handle.

A microcontroller is located on the receiving frame and responsive to the position of the locking pawl in the locked and unlocked positions to prevent a manual shutdown of the drive when the drive carrier has been locked within its receiving frame. The microcontroller is also adapted to generate visual status indicator signals when the drive is spun-up and ready to be accessed by the host computer, when the drive is spun-down and ready to be removed with its carrier from the receiving frame, when a cooling fan on the receiving frame malfunctions, or when the drive fails to receive power. The microcontroller is still further adapted to generate a visual warning signal in the event that a SAS (serial attached SCSI) drive has been inserted into a SATA (serial ATA) receiving frame. The microcontroller prevents such a SAS drive from being powered-up to avoid a potential overheating condition and a corresponding thermally induced system failure.

DESCRIPTION OF THE PREFERRED EMBODIMENT

Figure 1:
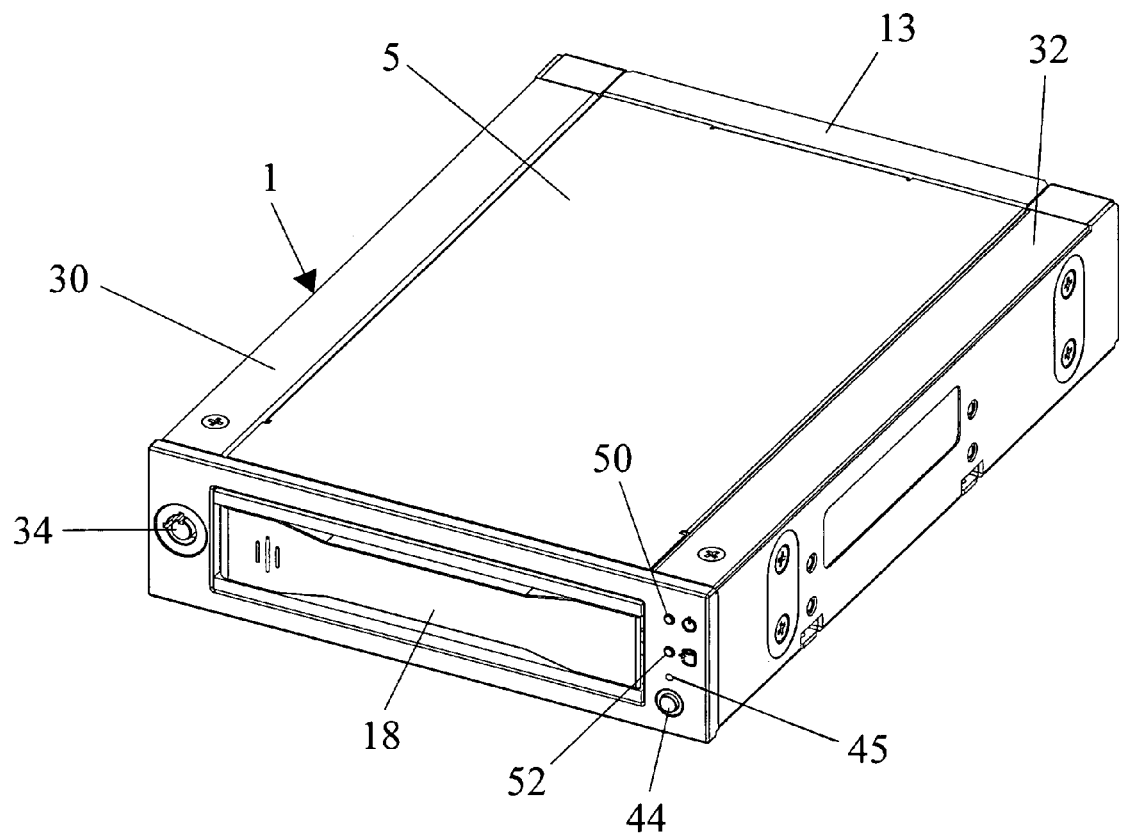
FIG. 1 shows a receiving frame having a removable computer drive carrier in which a computer drive is transported received inwardly of the frame with a handle of the carrier located in a closed position.
Figure 2:
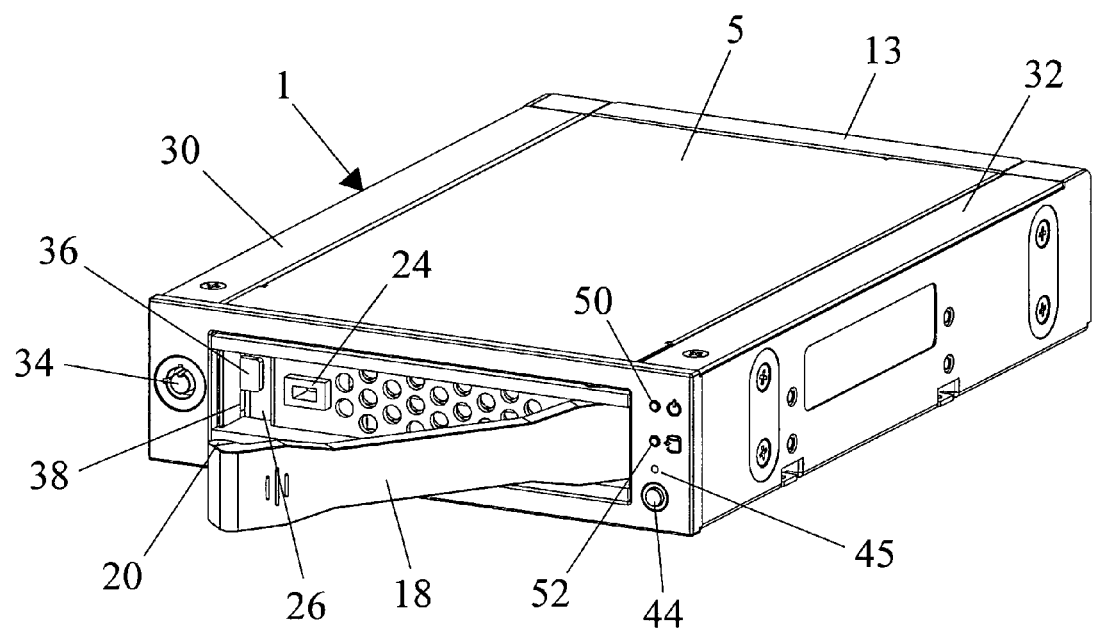
FIG. 2 shows the receiving frame and the computer drive carrier of FIG. 1 with the handle of the carrier located in an open position and a key controlled locking pawl moved to a locked position.
Figure 3:
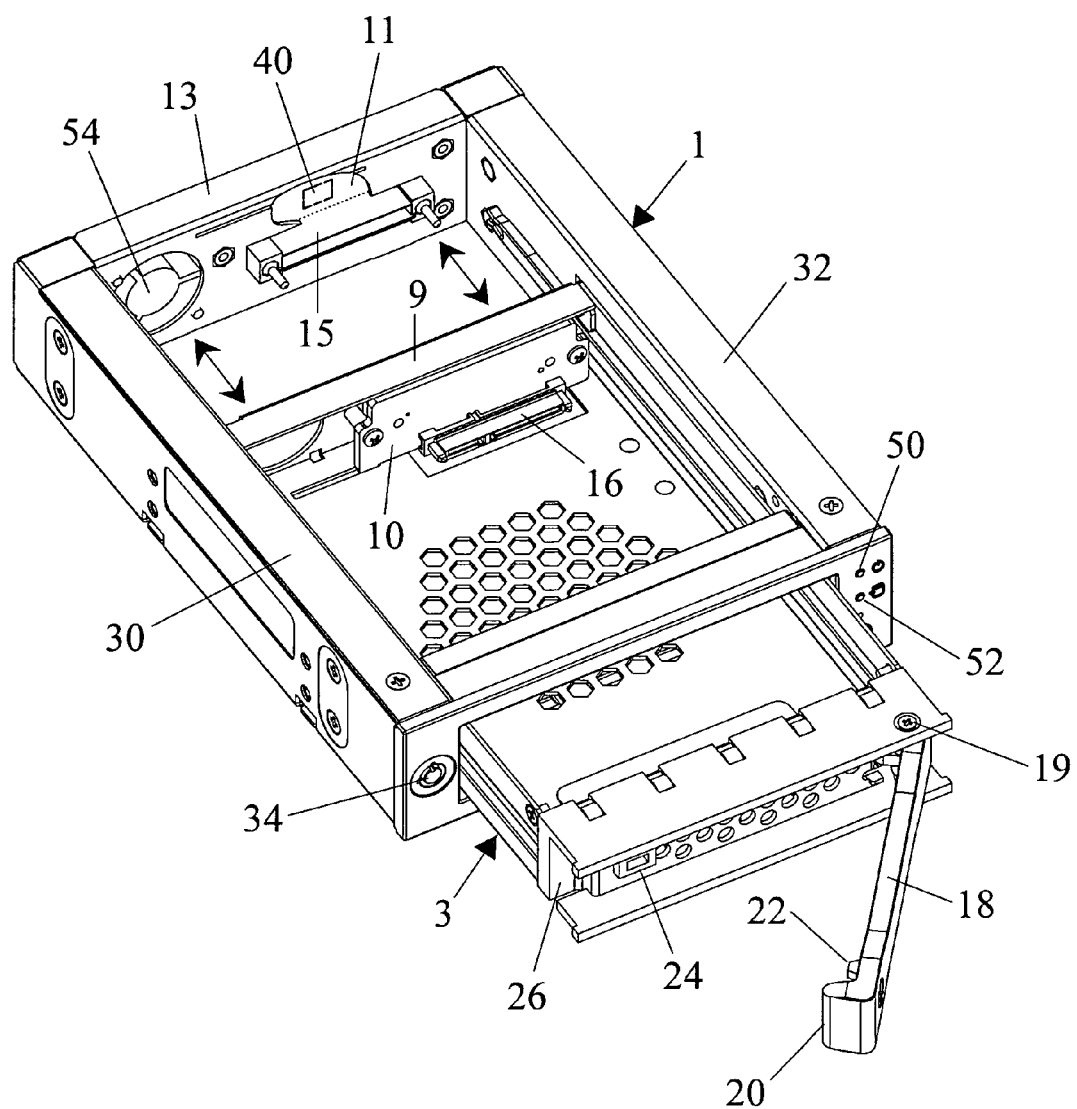
FIG. 3 shows the handle of the receiving frame in the open position at which to receive an outward pulling force by which the computer drive carrier is removed from the receiving frame.

Referring concurrently to FIGS. 1-4 of the drawings, there is shown a (e.g., rectangular) receiving frame 1 having an opening through the front for receiving therewithin a removable computer drive carrier (designated 3 in FIG. 3). The opposite sides 30 and 32 of receiving frame 1 are hollow for a purpose that will soon be described. The computer drive carrier 3 encloses a standard computer drive (not shown) such as a disc drive, or the like. The receiving frame 1 is typically mounted in a computer drive bay or similar enclosure (also not shown) by which the computer drive that is enclosed within the drive carrier 3 can be interfaced with and accessed by a host computer. A cover 5 extends across the top of the receiving frame 1 to enclose the computer drive carrier 3 therewithin. The carrier 3 is slidable into and out of receiving frame 1 to enable the computer drive to be transported from place-to-place and/or to be replaced by a different drive.

Figure 4:
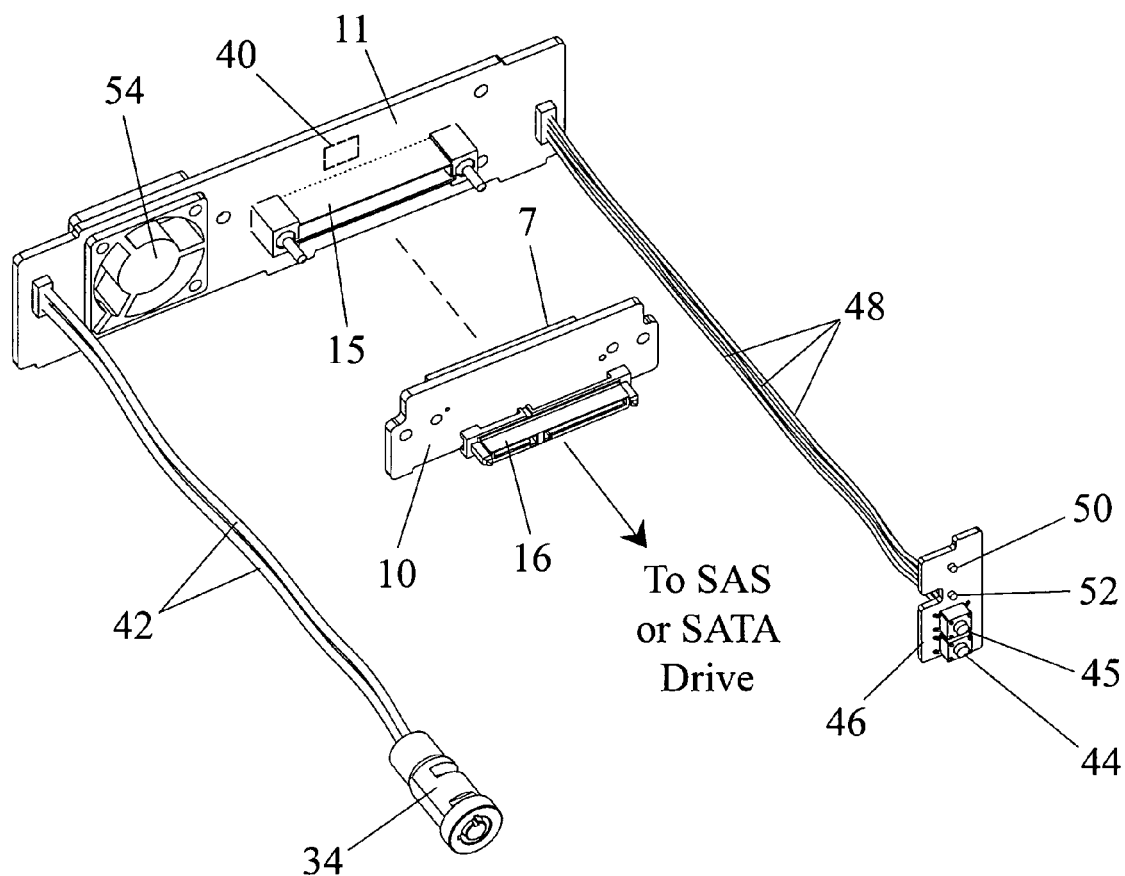
FIG. 4 shows a receiving frame printed circuit board on which a microcontroller is located so as to be interconnected with a lock, a push-button power switch, and a pair of LED indicators that are accessible at the front of the receiving frame.

As is best shown in FIGS. 3 and 4, the drive carrier 3 includes a circuit board 10 attached inside the incoming back end 9 thereof. Projecting rearwardly from the circuit board 10 through the back end 9 of carrier 3 is a first electrical connector 7. A printed circuit board 11 is mounted on the outside of the rear wall 13 of receiving frame 1, and a complementary electrical connector 15 projects forwardly from the printed circuit board 11 to be mated to the incoming connector 7 from carrier 3 by which power, data and control signals can be provided to the computer drive. Projecting forwardly from the circuit board 10 at the back end 9 of carrier 3 is a drive interface connector 16 to be mated to the computer drive so that the power, data and control signals can be supplied thereto by way of connectors 7 and 15.

The printed circuit board 11 of receiving frame 1 carries display control and I/O logic to interface receiving frame 1 with its host computer. Each of the connector 7 at the incoming back end 9 of the computer drive carrier 3 and the opposing connector 15 on the board 11 at the rear wall 13 of receiving frame 1 is preferably characterized by high speed (e.g, capable of data rates of 10 Gbps) and the ability to be subjected to a high number of insertion/extraction cycles. By virtue of the removable characteristic of the computer drive carrier 3 and the detachable mating connection of the complementary connectors 7 and 15, the carrier 3 can be pulled outwardly from receiving frame 1 and replaced with a new carrier without a prolonged interruption of service.

The computer drive carrier 3 is provided with a unique handle 18 that is manually accessible at the front of the computer drive carrier 3 so as to be manipulated when it is desirable to remove the carrier 3 from its receiving frame 1. A first end of handle 18 is pivotally connected to the front of the computer drive carrier 3 by means of a spring-wound fastener 19 (of FIG. 3), or the like, so that the handle 18 is rotatable from a closed position (as shown in FIG. 1) extending laterally across the front end of the computer drive carrier 3 when the carrier is located inwardly of its receiving frame 1 to an open position (as shown in FIG. 2) rotated away from the front end of the drive carrier 3 when the carrier is ready to be pulled out and removed from receiving frame 1.

The opposite free end of handle 18 includes a rearwardly extending projection 20. Located inside the handle 18 adjacent the projection 20 is a rearwardly projecting handle release or locking nub 22 (best shown in FIG. 3). As the handle 18 is rotated from the open position to the closed position, the locking nub 22 is correspondingly rotated into receipt of and captured by a spring-loaded catch 24 that is positioned at the front of the computer drive carrier 3. When the locking nub 22 is moved into receipt by the spring-loaded catch 24 as handle 18 is rotated to the closed position, the projection 20 at the free end of handle 18 is rotated into a lock housing 26 that is recessed at one side of the front of the computer drive carrier 3. As will be explained hereinafter, the end projection 20 of handle 18 cooperates with a locking system of the receiving frame 1 to prevent the unauthorized or unintentional removal of the computer drive carrier 3 from the receiving frame 1.

With the locking nub 22 captured by the spring-loaded catch 24, the handle 18 will be retained in the closed position of FIG. 1 extending laterally across the front end of the computer drive carrier 3. When it is desirable to remove the carrier 3 from its receiving frame 1, an inward pushing force is momentarily applied to the handle 18 by which to cause the end projection 20 to move into and through the recessed lock housing 26. At the same time, the locking nub 22 that is carried by handle 18 is moved towards and against the spring-loaded catch 24 by which to cause the locking nub 22 to be released by and ejected from the spring-loaded catch 24, whereby the handle 18 will automatically rotate to the open position of FIG. 2. A pulling force may now be applied to the handle 18 in the open position to cause the computer drive carrier 3 to slide outwardly from its receiving frame 1 in the manner shown in FIG. 3.

A key operated lock 34 is accessible at one of the hollow sides 30 of the receiving frame 1. A key (not shown) is inserted and rotated in lock 34 to control the corresponding rotational movement of a locking pawl 36. The locking pawl 36 is shown in FIG. 2 rotated to a locked position projecting outwardly from the hollow side 30 of frame 1 through a slot 38. A rotation of the key in the lock 34 in an opposite direction will cause a corresponding rotation of the locking pawl 36 so as to be retracted inwardly of the side 30 via slot 38. With the computer drive carrier 3 installed in receiving frame 1 in the manner shown in FIG. 1 and the locking pawl 36 rotated to the locked position in the manner shown in FIG. 2, a stop is created across the lock housing 26 to lie in front of the end projection 20 of handle 18 and thereby lock the carrier 3 in place. In particular, when the handle 18 is rotated to the closed position, the stop created by the locking pawl 36 in the locked position prevents a removal of carrier 3 from its receiving frame 1 until such time as when the locking pawl 36 is rotated in an opposite direction to the unlocked position and the stop across the lock housing 26 is retracted into the side 30.

That is to say, and as was previously described, when it is desirable to remove the computer drive carrier 3 from receiving frame 1, an inward pushing force is momentarily applied to the handle 18 by which to cause the end projection 20 of handle 18 to move into and through the recessed lock housing 26 and thereby cause the locking nub 22 that is carried by handle 18 to be released by and ejected from the spring-loaded catch 24 at the front of carrier 3. Following a release of locking nub 22, the handle 18 will automatically rotate (by means of the spring-wound fastener 19) from the closed position of FIG. 1 to the open position of FIG. 2 at which to receive an outward pulling force.

However, with the key controlled locking pawl 36 moved to the locked position across the lock housing 26 as shown in FIG. 2, the end projection 20 of the handle 18 will begin to move towards and strike the locking pawl 36 and the stop created thereby when the inward pushing force has been momentarily applied to handle 18. After the end projection 20 of handle 18 strikes the locking pawl 36, any further inward displacement of the end projection 20 through lock housing 26 will be blocked so as to prevent a corresponding movement of the locking nub 22 carried by handle 18 towards the spring-loaded catch 24. Therefore, the locking nub 22 cannot be moved against and ejected from the catch 24, and the handle 18 of the computer drive carrier 3 will not rotate from the closed position to the open position. Accordingly, the carrier 3 will remain locked in place and is unable to be removed from its receiving frame 1.

In other words, the stop created by the key controlled locking pawl 36 moving to the locked position across the lock housing 26 as shown in FIG. 2 ultimately prevents the locking nub 22 from moving against the spring loaded catch 24 and stops a removal of the computer drive carrier 3 from receiving frame 1. The foregoing is accomplished by the locking pawl 36 blocking the movement of the end projection 20 of handle 18 inwardly through the lock housing 26 in response to a pushing force applied to handle 18 in an attempt to cause the locking nub 22 to be released by the spring-loaded catch 24. Thus, the handle 18 cannot rotate to the open position at which to receive an outward pulling force to cause the computer drive carrier 3 to slide outwardly from its receiving frame 1.

As is best shown in FIG. 4, the key operated lock 34 is electrically connected to a microcontroller 40 by way of wires 42 that run through the hollow side 30 of the receiving frame 1 of FIGS. 1-3. The microcontroller 40 is carried by the printed circuit board 11 that is mounted on the outside of the rear wall 13 of receiving frame 1. A suitable microcontroller for use herein is an 8-bit computing device with programmable flash memory manufactured by Atmel under Part No. ATtiny 2313/V, or the like. The microcontroller 40 is responsive to whether the lock 34 has been rotated by its key to the locked or unlocked position.

The microcontroller 40 is programmed to enable the computer drive to be powered on or off at any time without having a key readily available to insert into the key operated lock 34. More particularly, a push-button power switch 44 and a reset button 45 are located on a circuit board 46 that is mounted inside the front face of the receiving frame 1 of FIGS. 1-3 such that the switch 44 and button 45 are accessible to users. The power switch 44 and reset button 45 on circuit board 46 are electrically connected to the microcontroller 40 at the receiving frame board 11 by way of wires 48 that run through the hollow side 32 of receiving frame 1.

The microcontroller 40 advantageously prevents a manual shutdown of the drive transported by the computer drive carrier 3 inserted in receiving frame 1 when the locking pawl 36 of the key operated lock 34 is in the locked position (as illustrated in FIG. 2) by temporarily disabling and overriding the push-button power switch 44.

Moreover, if the computer drive carrier 3 is already installed and locked in place in its receiving frame 1 before a system power-up, the power switch 44 need not be depressed (and held) to power-on the drive. In this case, as the computer system powers up, the microcontroller 40 will cause the drive to simultaneously power-on and spin-up, and a drive ready indicator LED 50 will initially begin to flash. The drive ready indicator LED 50 is mounted on the circuit board 46 so as to be connected to and controlled by the microcontroller 40 via the wires 48 while remaining visually accessible to users at the front of the receiving frame 1. When the drive is ready to be accessed by the host computer, the microcontroller 40 will cause the drive ready indicator LED 50 to change from flashing to a steady color.

However, if the receiving frame 1 is initially devoid of the computer drive carrier 3 when the computer system is first powered up, then a carrier must be installed to interface the drive thereof with the host computer. In this case, the push button power switch 44 must be depressed (and held) to enable the drive to be powered on. That is to say, if a computer drive carrier has been removed from its receiving frame and replaced by a different carrier, a key will not be required in lock 34 provided that the computer system has already been powered up. Following a depression of the power switch 44, the drive ready indicator LED 50 will begin to flash. When the drive of the new carrier is ready to be accessed by the host computer, the indicator LED 50 changes from flashing to the same steady color.

When it is desirable to remove the computer drive carrier 3 from its receiving frame 1, the computer drive must first be powered off. In this case, the push button power switch 44 is depressed (and held) until the indicator LED 50 begins to flash. The carrier can be safely removed from the receiving frame when the drive stops spinning and the indicator LED 50 changes from flashing to off (i.e., no color).

The drive ready indicator LED 50 may generate more than a first color to indicate when a computer drive is powered on or off and is ready for access or removal. To this end, the indicator LED 50 may be a bi-color light that is also capable of emitting a second color. By way of example, the microcontroller 40 can be responsive to a failure of a cooling fan (designed 54 and mounted on the printed circuit board 11 at the rear 13 of receiving frame 1). Should the microcontroller 40 detect a fan failure, then the indicator LED will emit flashing alternating first and second colors.

In this same regard, the microcontroller 40 can be made responsive to a DC power failure such that the computer drive will receive no power. In this case, the microcontroller 40 will cause the indicator LED 50 to generate a steady second color should power be unexpectedly interrupted.

As will be known to those skilled in the art, the computer drive being transported by the computer drive carrier 3 of FIGS. 1-3 may be either one of a SAS (serial attached SCSI) drive or a SATA (serial ATA) drive. While a SATA drive may be inserted in either one of a SAS or a SATA receiving frame 1, a SAS drive should only be inserted in a SAS receiving frame. A SAS drive inserted in a SATA receiving frame is known to run at a relatively hot temperature, such that the fan 54 may not be able to provide adequate cooling to avoid a thermally induced failure.

One pin of the electrical connector 15 at the receiving frame printed circuit board 11 is dedicated to determining whether a SAS or a SATA drive is inserted into the drive carrier receiving frame 1. In the case where a SAS drive is detected in a SATA receiving frame, a drive activity LED 52 will be illuminated. The drive activity LED 52 is mounted on the circuit board 46 so as to be connected to microcontroller 40 via the wires 48. The drive activity LED 52 is positioned at the front of the receiving frame 1 so as to be visually accessible to users. At the same time that LED 52 is illuminated to provide a warning signal of a drive/receiving frame mismatch, the microcontroller 40 will prevent the SAS drive from powering up by overriding the push button power switch 44. In this manner, the operator will be notified that a drive carrier 3 transporting a SAS drive should be removed from a SATA receiving frame 1 and replaced with a different carrier so as not to interrupt normal computer system operation as a consequence of possible overheating.

We claim:

1. A combination, comprising:
a receiving frame to be interfaced with a computer;
a computer drive carrier for transporting a computer drive on which computer data is stored, said computer drive carrier being removably received within said receiving frame to enable the computer drive thereof to communicate with the computer,
said computer drive carrier having a handle that is movable between open and closed positions, said handle being moved to the closed position after said computer drive carrier is received by said receiving frame, and said handle being moved to the open position when said computer drive carrier is to be removed from said receiving frame; and
a lock by which to prevent said handle from moving from the closed position to the open position to thereby prevent a removal of said computer drive carrier from said receiving frame.

2. The combination recited in claim 1, wherein said handle has a handle release projecting therefrom and said computer drive carrier has a spring-loaded catch, said handle release being moved into and captured by said spring-loaded catch when said handle is moved from the open position to the closed position, said handle release being moved against and ejected from said spring-loaded catch in response to a pushing force applied to said handle by which to cause said handle and said handle release thereof to move together in a direction towards said spring-loaded catch.

3. The combination recited in claim 2, wherein said lock includes a locking pawl movable between an unlocked position, at which to permit said handle and said handle release thereof to move together in the direction towards said spring-loaded catch in response to the pushing force applied to said handle, and a locked position, at which to block said handle and said handle release from moving in the direction towards said spring-loaded catch, whereby to prevent said handle from moving to the open position from the closed position.

4. The combination recited in claim 3, wherein said receiving frame has at least one hollow side along which said computer drive carrier is moved when said carrier is received by or removed from said receiving frame, said lock being attached to said hollow side and said locking pawl being movable between said unlocked position located inwardly of said hollow side and said locked position projecting outwardly from said hollow side at which to block said handle and said handle release.

5. The combination recited in claim 4, wherein the locking pawl of said lock projects outwardly from the hollow side of said receiving frame to contact said handle when said locking pawl is moved to the locked position at which to block said handle and said handle release thereof from moving together in the direction towards said spring-loaded catch, whereby to prevent said handle release from being moved against and ejected from said spring-loaded catch so that said handle cannot move to the open position from the closed position.

6. The combination recited in claim 5, wherein a first end of said handle extends towards said spring-loaded catch, the locking pawl of said lock moving to the locked position at a location between said first end and said spring-loaded catch to create a stop and thereby block said handle and said handle release from moving together in the direction towards said spring-loaded catch to prevent said handle from moving to the open position from the closed position.

7. The combination recited in claim 3, wherein said lock is operated by a key, said key being rotated in said lock to cause a corresponding movement of said locking pawl between the unlocked position and the locked position.

8. The combination recited in claim 3, further comprising a microcontroller responsive to whether the locking pawl of said lock is in the locked or unlocked position and whether said computer drive carrier is received by or removed from said receiving frame, said microcontroller controlling the supply of power to the computer drive transported by said computer drive carrier when said computer drive carrier is received by said receiving frame and said locking pawl is in the locked position.

9. The combination recited in claim 1, wherein said handle has a first end pivotally connected to said computer drive carrier and an opposite free end rotatable between said closed and said open positions.

10. The combination recited in claim 1, further comprising a microcontroller and
wherein the computer drive transported by said computer drive carrier is one of a SAS or a SATA drive and said receiving frame is one of a SAS or a SATA frame,
said microcontroller being responsive to and generating a warning signal when the carrier of a SAS drive is received within a SATA receiving frame.

11. A combination, comprising:
a receiving frame to be interfaced with a computer;
a computer drive carrier for transporting a computer drive on which computer data is stored, said computer drive carrier being removably received within said receiving frame to enable the computer drive thereof to communicate with the computer,
the computer drive of said computer drive carrier being one of a SAS or a SATA drive and said receiving frame being one of a SAS or a SATA frame; and
a microcontroller being responsive to and generating a warning signal when the carrier of a SAS drive is received within a SATA receiving frame.

12. The combination recited in claim 11, further comprising a lock having a locked position at which to prevent a removal of said computer drive carrier from said receiving frame and an unlocked position at which to permit the removal of said computer drive carrier from said receiving frame, said microcontroller being responsive to whether said lock is in the locked position or the unlocked position so as to cause the computer drive transported by said computer drive carrier to power up simultaneously with the computer if said computer drive carrier is located in said receiving frame when the computer is initially powered on and said lock is in the locked position.

13. The combination recited in claim 12, further comprising a manually operated power switch connected to said microcontroller, said power switch being operated so that the computer drive transported by said computer drive carrier receives power in the event that said computer drive carrier was not located in said receiving frame when the computer was powered on.

14. The combination recited in claim 13, wherein said microcontroller is adapted to temporarily disable said manually operated power switch when said lock is in the locked position and said computer drive is receiving power.

15. The combination recited in claim 11, wherein the warning signal generated by said microcontroller is a visual warning signal.

16. The combination recited in claim 11, wherein said microcontroller is adapted to prevent a SAS drive from powering up in the event that the computer drive carrier of said SAS drive is received within a SATA receiving frame.

17. The combination recited in claim 11, wherein said microcontroller is also responsive to the computer drive carrier of a SATA computer drive being received within a SAS or a SATA receiving frame and the computer drive carrier of a SAS computer drive being received within a SAS receiving frame for generating a first drive indicator signal when said SAS or SATA drive is powered up and ready to communicate with the computer and a second drive indicator signal when said SAS or SATA drive is powered down and ready to be removed from said SAS or SATA receiving frame.

18. The combination recited in claim 11, further comprising a fan located at said receiving frame to cool the SAS or SATA computer drive transported by said computer drive carrier, said microcontroller being responsive to a failure of said fan by generating a fan failure indicator signal.

19. The combination recited in claim 11, wherein said microcontroller is responsive to a failure of the computer drive transported by said computer drive carrier to receive power by generating a power failure signal.

* * * * *